(12) United States Patent
Strack et al.

(10) Patent No.: US 8,192,666 B2
(45) Date of Patent: Jun. 5, 2012

(54) METHOD FOR PRODUCING A LINER OF A VESSEL

(75) Inventors: Ludger Strack, Heidenrod (DE); Markus Lindner, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 12/713,774

(22) Filed: Feb. 26, 2010

(65) Prior Publication Data

US 2011/0210475 A1 Sep. 1, 2011

(51) Int. Cl.
*B29C 45/14* (2006.01)
*B29C 45/16* (2006.01)
(52) U.S. Cl. ........ 264/255; 264/537; 264/250; 264/261; 264/275
(58) Field of Classification Search .......... None
See application file for complete search history.

(56) References Cited

U.S. PATENT DOCUMENTS

| | | | | |
|---|---|---|---|---|
| 3,137,898 A * | 6/1964 | Geringer | ........................ | 425/389 |
| 3,972,976 A * | 8/1976 | Farrell | ........................ | 264/314 |
| 4,098,857 A * | 7/1978 | Farrell | ........................ | 264/529 |
| 4,360,116 A * | 11/1982 | Humphrey | ........................ | 220/586 |
| 5,429,845 A * | 7/1995 | Newhouse et al. | ........................ | 428/34.1 |
| 7,918,956 B2 * | 4/2011 | Mehta et al. | ........................ | 156/172 |
| 2010/0072209 A1 * | 3/2010 | Hatta | ........................ | 220/586 |
| 2010/0075200 A1 * | 3/2010 | Hatta | ........................ | 429/34 |
| 2011/0094658 A1 * | 4/2011 | Hill et al. | ........................ | 156/172 |
| 2011/0210128 A1 * | 9/2011 | Strack et al. | ........................ | 220/592 |

\* cited by examiner

*Primary Examiner* — Edmund H. Lee
(74) *Attorney, Agent, or Firm* — Fraser Clemens Martin & Miller LLC; J. Douglas Miller (57) ABSTRACT

A vessel and method for forming the vessel is disclosed, the vessel having an injection blow molded hollow liner, wherein the hollow liner includes reinforced interfacial features formed substantially around a portion of at least one vessel penetration element.

20 Claims, 5 Drawing Sheets

METHOD FOR PRODUCING A LINER OF A VESSEL

FIELD OF THE INVENTION

The invention relates to vessels. More particularly, the invention is directed to an injection blow molding method for producing a liner of a pressure vessel including at least one vessel penetration element.

BACKGROUND OF THE INVENTION

Presently, there are a variety of vessels designed to contain various fluids such as compressed natural gas (CNG), hydrogen gas for use in a fuel cell, and the like, for example. A common technique for storing the fluid is in a lightweight, high pressure vessel resistant to punctures. Traditionally, such vessels are divided into four types. A Type I vessel is a metal vessel. A Type II vessel is also a metal vessel, the vessel having an outer composite shell disposed on a cylindrical section thereof. A Type III vessel consists of a liner produced from a metal such as steel and aluminum, for example, and an outer composite shell that encompasses the liner and militates against damage thereto, A Type IV vessel is substantially similar to the Type III vessel, wherein the liner is produced from a plastic.

Typically, the liner is manufactured using conventional forming processes such as a welding process, a rotational molding process, and other similar processes, for example. During the welding process, multiple components of the liner are welded together at seams of the components. The weld seams, however, may not be fluid-tight and permit permeation of the stored fluid from the vessel. Further, the welding process limits the types of material which can be used to form the liner. On the other hand, the rotational molding process is slower and produces a liner having an adverse thickness. During the rotational molding process, the liner is formed by disposing vessel penetration elements in a die cavity with a polymer resin, heating the mold while being rotated to cause the resin to melt and coat walls of the die cavity, cooling the die, and removing the molded liner. The vessel penetration elements, however, may not properly adhere to the liner resulting in formation of a space therebetween. If the vessel penetration elements are not properly adhered to the liner, a fluid-tight seal between the vessel penetration elements and the liner may not form. Without a fluid-tight seal, the contents of the vessel may escape therefrom to the atmosphere. To ensure fluid-tight seals between the vessel penetration elements and the liner, adhesives, heat welding, and other similar processes may be employed. Such processes may be time consuming and require manual process steps, thereby resulting in an increased cost to produce the vessel.

It would be desirable to develop a method for producing a liner of a vessel including at least one vessel penetration element, wherein an efficiency of the method is optimized and a cost thereof is minimized.

SUMMARY OF THE INVENTION

In concordance and agreement with the present invention, a method for producing a liner of a vessel including at least one vessel penetration element, wherein an efficiency of the method is optimized and a cost thereof is minimized, has surprisingly been discovered.

One method comprises the steps of: disposing a first vessel penetration element into a die having a cavity formed therein; injecting a first moldable material into the cavity to form a first portion of a preform, wherein the first portion of the preform substantially surrounds at least a portion of the vessel penetration element; injecting a second moldable material into the cavity to form a second portion of the preform; and forming the preform into a hollow liner.

Another method comprises the steps of: disposing a first vessel penetration element into a die having a cavity formed therein; injecting a first reinforced moldable material into the cavity to form a first portion of a preform, wherein the first portion of the preform substantially surrounds at least a portion of the vessel penetration element; injecting a second moldable material into the cavity to form a second portion of the preform; forming the preform into a hollow liner, the hollow liner including a main body, a first interfacial feature, and a second interfacial feature, wherein the main body is formed from the second moldable material and the interfacial features are formed from the first reinforced moldable material; and forming an outer shell substantially around the hollow liner.

Another method comprises the steps of: disposing a first vessel penetration element into a die having a cavity formed therein; injecting a first moldable material into the cavity to form a first portion of a perform, wherein the first portion of the perform substantially surrounds at least a portion of the vessel penetration element; injecting a second moldable material into the cavity to form a second portion of the preform; injecting a third moldable material into a core of the second moldable material; and forming the preform into a hollow liner.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
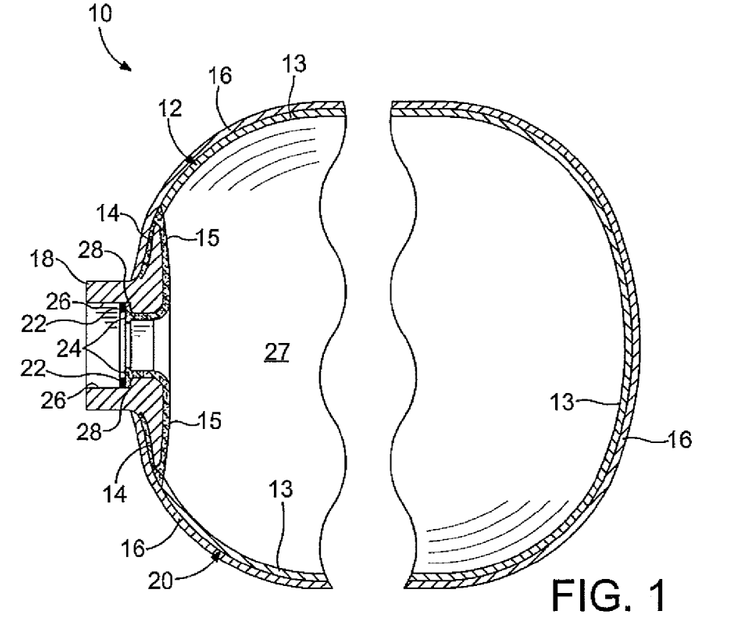
FIG. 1 is a cross-sectional elevational view of a vessel according to an embodiment of the invention.

FIG. 1 illustrates a vessel 10. The vessel 10 includes a hollow liner 12 having a main body 13, a first interfacial feature 14, and a second interfacial feature 15. In the embodiment shown, the vessel 10 further includes an outer shell 16. The vessel 10 has a substantially cylindrical shape and is adapted to hold a pressurized fluid (not shown). It is understood that the vessel 10 may have any shape as desired, and the vessel 10 may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 13 of the liner 12 is formed from a moldable material such as polyethylene, polyethylene terephthalate (PET), ethylene vinyl alcohol, and a polyamide material, for example.

The interfacial features 14, 15 are formed around at least a portion of a vessel penetration element 18 such as a boss, a component of a divided boss, a fitting, an insert, and the like, for example. The interfacial features 14, 15 are disposed at a first end 20 of the liner 12. As shown in FIG. 1, the interfacial features 14, 15 are formed from a reinforced moldable material such as a fiberglass reinforced thermoplastic (e.g. reinforced polyethylene, PET, and a polyamide material), for example. It is recognized that to optimize a connection between mating surfaces of the interfacial features 14, 15 and the vessel penetration element 18, the reinforced moldable material used to produce the interfacial features 14, 15 has a coefficient of linear thermal expansion between a coefficient of linear thermal expansion of a material used to produce the vessel penetration element 18 and a coefficient of linear thermal expansion of the moldable material used to produce the main body 13 of the liner 12. At least one of the interfacial features 14, 15 may include a gasket 22, such as a polymeric o-ring, for example, disposed thereon. In the embodiment shown, the gasket 22 is disposed adjacent an annular shoulder 24 of the interfacial feature 15 and an inner surface 26 of the vessel penetration element 18. The gasket 22 is adapted to form a fluid-tight seal between the interfacial feature 15 and a fluid-communication element (not shown) for communicating with an interior 27 of the vessel 10, such as a fitting, a hose, a nozzle, a conduit, and the like, for example. It is understood that the gasket 22 may be disposed elsewhere between the interfacial feature 15 and the fluid-communication element, if desired. The gasket 22 may be any conventional gasket formed from a material which facilitates forming a fluid-tight seal between two contacting surfaces.

The vessel penetration element 18 is typically a separately produced finish that forms an opening into the interior 27 of the vessel 10, and is shaped to receive a closure element (not shown). The vessel 10 may include any number of vessel penetration elements 18, as desired. As shown in FIG. 1, the vessel penetration element 18 includes an annular shoulder 28 formed on the inner surface 26 thereof disposed adjacent the annular shoulder 24 of the interfacial feature 15. The vessel penetration element 18 may also include at least one of an annular groove (not shown) and threads (not shown) formed on the inner surface 26 thereof adapted to receive a portion of the fluid-communication element. The vessel penetration element 18 may be formed from any suitable material having desired properties such as a metal, for example.

In the embodiment shown, the outer shell 16 of the vessel 10 substantially abuts the main body 13 of the liner 12 and a portion of the interfacial feature 14. A portion of the outer shell 16 is disposed on the vessel penetration element 18. The outer shell 16 is typically formed by a filament winding and curing process using a fiber material such as a carbon fiber, a glass fiber, a composite fiber, and a fiber having a resin coating, for example. It is understood that the material used to form the outer shell 16 may be selected based on the process used to dispose the outer shell 16 onto the liner 12, the use of the vessel 10, and the properties of the fluid to be stored in the vessel 10. It is further understood that the outer shell 16 can be formed by other forming methods, as desired.

Figure 2:
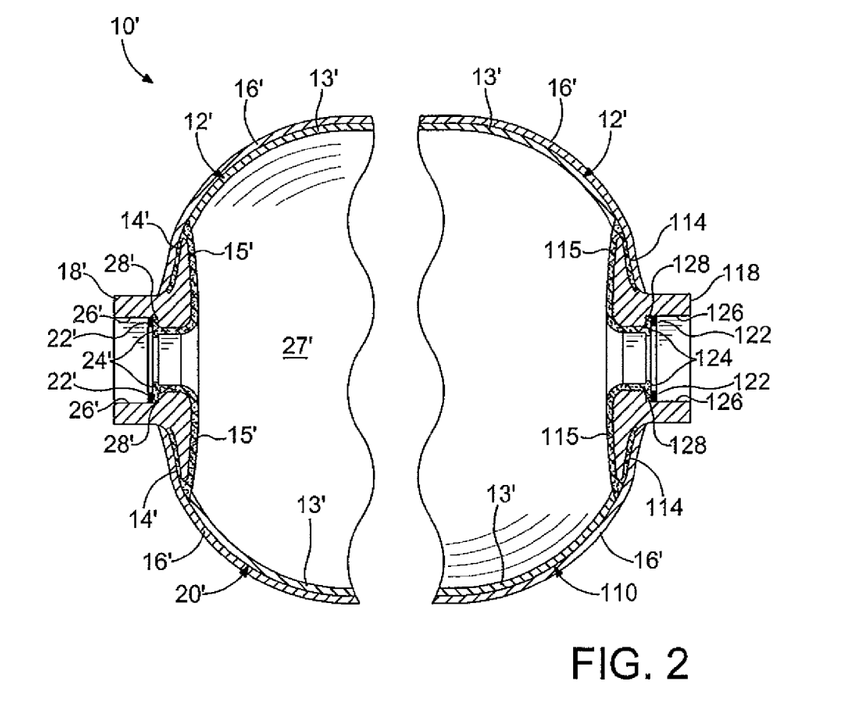
FIG. 2 is a cross-sectional elevational view of a vessel according to another embodiment of the invention.

FIG. 2 shows a vessel 10' according to another embodiment of the invention. The embodiment of FIG. 2 is similar to the vessel 10 of FIG. 1, except as described below. Similar to the structure of FIG. 1, FIG. 2 includes the same reference numerals accompanied by a prime (') to denote similar structure.

The vessel 10' includes a hollow liner 12' having a main body 13', a first end 20', and a second end 110. In the embodiment shown, the vessel 10' further includes an outer shell 16'. The vessel 10' has a substantially cylindrical shape and is adapted to hold a pressurized fluid (not shown). It is understood that the vessel 10' may have any shape as desired, and the vessel 10' may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 13' of the liner 12' is formed from a moldable material 153 shown in FIG. 3 such as polyethylene, PET, ethylene vinyl alcohol, and a polyamide material, for example.

A first interfacial feature 14' and a second interfacial feature 15' are formed at the first end 20' of the liner 12'. The interfacial features 14', 15' are formed around at least a portion of a vessel penetration element 18' such as a boss, a component of a divided boss, a fitting, an insert, and the like, for example. The interfacial features 14', 15' are formed from a reinforced moldable material 154 shown in FIG. 3 such as a fiberglass reinforced thermoplastic (e.g. reinforced polyethylene, PET, and a polyamide material), for example. It is recognized that to optimize a connection between mating surfaces of the interfacial features 14', 15' and the vessel penetration element 18', the reinforced moldable material 154 used to produce the interfacial features 14', 15' has a coefficient of linear thermal expansion between a coefficient of linear thermal expansion of a material used to produce the vessel penetration element 18' and a coefficient of linear thermal expansion of the moldable material 153 used to produce the main body 13' of the liner 12'. At least one of the interfacial features 14', 15' may include a gasket 22', such as a polymeric o-ring, for example, disposed thereon. In the embodiment shown, the gasket 22' is disposed adjacent an annular shoulder 24' of the interfacial feature 15' and an inner surface 26' of the vessel penetration element 18'. The gasket 22' is adapted to form a fluid-tight seal between the interfacial feature 15' and a fluid-communication element (not shown) for communicating with an interior 27' of the vessel 10', such as a fitting, a hose, a nozzle, a conduit, and the like, for example. It is understood that the gasket 22' may be disposed elsewhere between the interfacial feature 15' and the fluid-communication element, if desired. The gasket 22' may be any conventional gasket formed from a material which facilitates forming a fluid-tight seal between two contacting surfaces.

The vessel penetration element 18' is typically a separately produced finish that forms an opening into the interior 27' of the vessel 10', and is shaped to receive a closure element (not shown). The vessel 10' may include any number of vessel penetration elements 18', as desired. As shown in FIG. 2, the vessel penetration element 18' includes an annular shoulder 28' formed on the inner surface 26' thereof disposed adjacent the annular shoulder 24' of the interfacial feature 15'. The vessel penetration element 18' may also include at least one of an annular groove (not shown) and threads (not shown) formed on the inner surface 26' thereof adapted to receive a portion of the fluid-communication element. The vessel penetration element 18' may be formed from any suitable material having desired properties such as a metal, for example.

A third interfacial feature 114 and a fourth interfacial feature 115 are formed at the second end 110 of the liner 12'. The interfacial features 114, 115 are formed around at least a portion of a vessel penetration element 118 such as a boss, a component of a divided boss, a fitting, an insert, and the like, for example. The interfacial features 114, 115 are formed from a reinforced moldable material 158 shown in FIG. 3 such as a fiberglass reinforced thermoplastic (e.g. reinforced polyethylene, PET, and a polyamide material), for example. It is recognized that to optimize a connection between mating surfaces of the interfacial features 114, 115 and the vessel penetration element 118, the reinforced moldable material 158 used to produce the interfacial features 114, 115 has a coefficient of linear thermal expansion between a coefficient of linear thermal expansion of a material used to produce the vessel penetration element 118 and a coefficient of linear thermal expansion of the moldable material 153 used to produce the main body 13' of the liner 12'. At least one of the interfacial features 114, 115 may include a gasket 122, such as a polymeric o-ring, for example, disposed thereon. In the embodiment shown, the gasket 122 is disposed on an annular shoulder 124 of the interfacial feature 115 adjacent an inner surface 126 of the vessel penetration element 118. The gasket 122 is adapted to form a fluid-tight seal between the interfacial feature 115 and a fluid-communication element (not shown) for communicating with the interior 27' of the vessel 10', such as a fitting, a hose, a nozzle, a conduit, and the like, for example. It is understood that the gasket 122 may be disposed elsewhere between the interfacial feature 115 and the fluid-communication element, if desired. The gasket 122 may be any conventional gasket formed from a material which facilitates forming a fluid-tight seal between two contacting surfaces.

The vessel penetration element 118 is typically a separately produced finish that forms an opening into the interior 27' of the vessel 10', and is shaped to receive a closure element (not shown). The vessel 10' may include any number of vessel penetration elements 118, as desired. As shown in FIG. 2, the vessel penetration element 118 includes an annular shoulder 128 formed on the inner surface 126 thereof disposed adjacent the annular shoulder 124 of the interfacial feature 115. The vessel penetration element 118 may also include at least one of an annular groove (not shown) and threads (not shown) formed on the inner surface 126 thereof adapted to receive a portion of the fluid-communication element. The vessel penetration element 118 may be formed from any suitable material having desired properties such as a metal, for example.

In the embodiment shown, the outer shell 16' of the vessel 10' substantially abuts the main body 13' of the liner 12' and a portion of the interfacial features 14', 114. A portion of the outer shell 16' is disposed on the vessel penetration elements 18', 118. The outer shell 16' is typically formed by a filament winding and curing process using a fiber material such as a carbon fiber, a glass fiber, a composite fiber, and a fiber having a resin coating, for example. It is understood that the material used to form the outer shell 16' may be selected based on the process used to dispose the outer shell 16' onto the liner 12', the use of the vessel 10', and the properties of the fluid to be stored in the vessel 10'. It is further understood that the outer shell 16' can be formed by other forming methods, as desired.

To form the vessels 10, 10', the respective liners 12, 12' are injection blow molded. It is understood that the injection blow molding process of the liner 12' of the vessel 10' is substantially similar to the injection blow molding process of the liner 12 of the vessel 10. For simplicity only the forming of the vessel 10' is described hereinafter.

Figure 3:
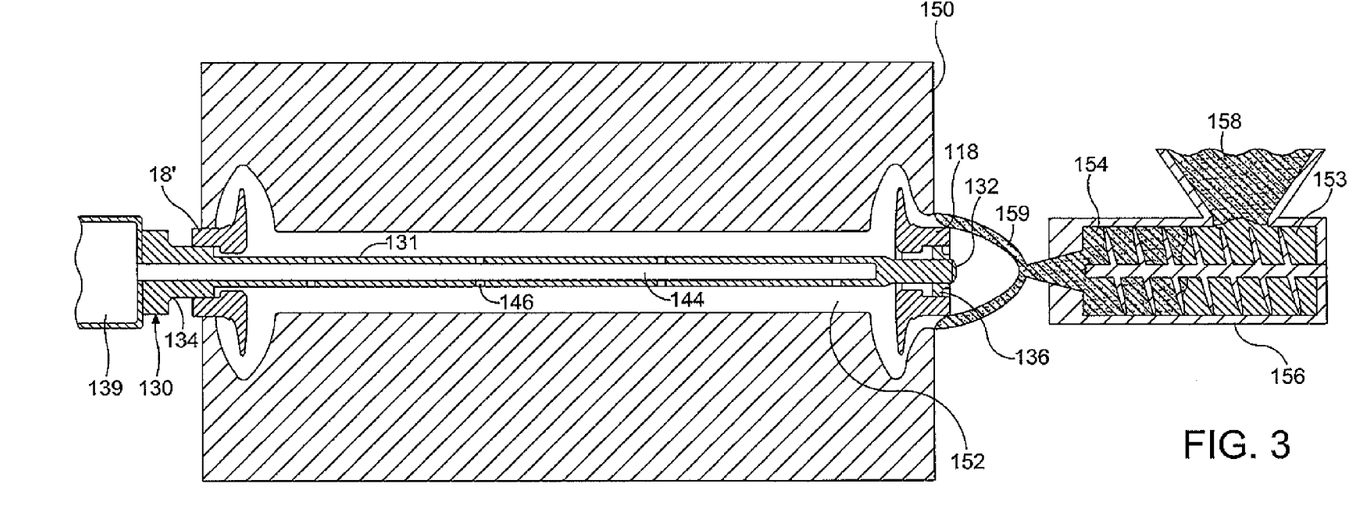
FIG. 3 is a schematic cross-sectional elevational view of an injector in fluid communication with a die having a pair of vessel penetration elements of the vessel illustrated in FIG. 2 disposed therein.

Referring now to FIG. 3, the vessel penetration elements 18', 118 are disposed on a positioning apparatus 130. In the embodiment shown, the positioning apparatus 130 is an elongated shaft 131 having a first end 132 and a second end 134. It is understood that the positioning apparatus 130 can have any length and diameter as desired suitable for any type of vessel. It is further understood that the positioning apparatus 130 can have an adjustable length and an adjustable diameter if desired. Although the positioning apparatus 130 shown is a unitary structure, it is understood that the positioning apparatus 130 can be an integration of multiple structures if desired. It is further understood that the positioning apparatus 130 can be a telescoping apparatus, thereby minimizing a time and a space required for use of the positioning apparatus 130 and the manufacture of the liner 12' of the vessel 10'. The positioning apparatus 130 can be produced from any material as desired such as a metal material, for example.

The first end 132 receives an adapter device 136 thereon. At least one of the first end 132 and the adapter device 136 cooperates with one of the groove and the threads formed on the inner surface 126 of the vessel penetration element 118 to form a substantially fluid-tight connection. It is understood, however, that the substantially fluid-tight connection can be formed elsewhere between various mating surfaces of the adapter device 136, the first end 132, and the vessel penetration element 118, as desired. The second end 134 cooperates with one of the groove and the threads formed on the inner surface 26' of the vessel penetration element 18' to form a substantially fluid-tight connection. It is understood, however, that the substantially fluid-tight connection can be formed elsewhere between various mating surfaces of the second end 134 and the vessel penetration element 18', as desired. It is further understood that the vessel penetration elements 18', 118 can be removably secured to the positioning apparatus 130 by any method of connection such as a threaded connection, a dovetail interlock connection, a ball and detent connection, a lock bar connection, and the like, for example.

The second end 134 is in fluid communication with a blow molding fluid source 139. It is understood that the fluid can be any fluid as desired such as air, for example. The second end 134 may be coupled to the fluid source 139 such as by a quick connection, a threaded connection, and the like, for example. It is understood that the fluid source 139 can be integrally formed with the positioning apparatus 130 if desired. A passageway 144 is formed in the shaft 131. The passageway 144 is in fluid communication with the fluid source 139 through an opening in the second end 134. The shaft 131 includes a plurality of linearly spaced annular arrays of apertures 146 formed therein. The apertures 146 permit a flow of the fluid from the passageway 144 to an environment surrounding the positioning apparatus 130. In the embodiment shown, the apertures 146 have a uniform size and shape and are uniformly spaced apart to facilitate a proper inflation of the liner 12' of the vessel 10'. It is understood that the apertures 146 can have any size and shape and can be spaced apart as desired such as a size and shape to militate against a flow of the moldable materials 153, 154, 158 therein, for example. Alternatively, the positioning apparatus 130 may further include a rotatable inner wall (not shown) having a plurality of linearly spaced annular arrays of apertures (not shown). In a first position, the apertures of the inner wall substantially align with the apertures 146 of the positioning apparatus 130 to permit the flow of fluid therethrough. In a second position, the inner wall facilitates a closure of the apertures 146, thereby militating against the flow of fluid therethrough and the flow of the moldable materials 153, 154, 158 therein.

Figure 4:
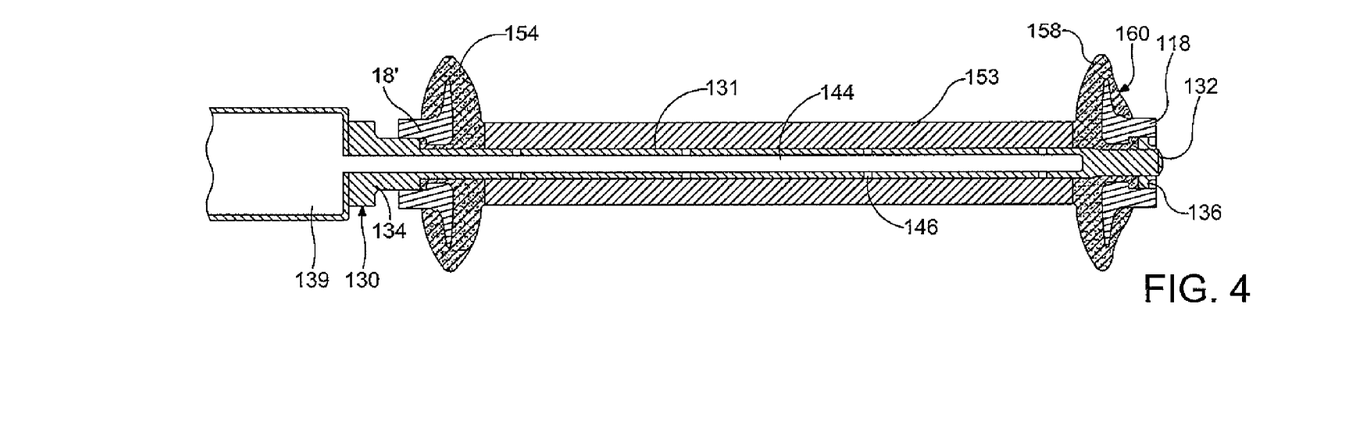
FIG. 4 is a cross-sectional elevational view of a preform used to form a liner of the vessel illustrated in FIG. 2.

During the injection blow molding process, the vessel penetration elements 118, 18' are disposed on the respective ends 132, 134 of the positioning apparatus 130. Subsequently, the adapter device 136 is received on the first end 132. Optionally, the inner wall of the positioning apparatus 130 is rotated to the second position, closing the apertures 146 formed in the shaft 131 of the positioning apparatus 130. Thereafter, a first die 150 such as a matched metal mold, for example, closes around the positioning apparatus 130 and the vessel penetration elements 18', 118, forming a cavity 152 therebetween. A molten form of the reinforced moldable material 154 is then injected from an injector 156, into and through a ring gate 159, and into the cavity 152 of the first die 150. Subsequently, a molten form of the moldable material 153 used to produce the main body 13' of the liner 12' is injected from the injector 156, into and through the ring gate 159, and into the cavity 152 of the first die 150. Thereafter, a molten form of the reinforced moldable material 158 is injected from the injector 156, into and through the ring gate 159, and into the cavity 152 of the first die 150. A preform 160, shown in FIG. 4, is formed substantially around a portion of the vessel penetration elements 18', 118 and the shaft 131 of the positioning apparatus 130. The preform 160 is permitted to cool in the first die 150 for a desired time. It is understood that the desired time is only as long as necessary for the preform 160 to retain a shape thereof when removed from the first die 150.

Figure 5:
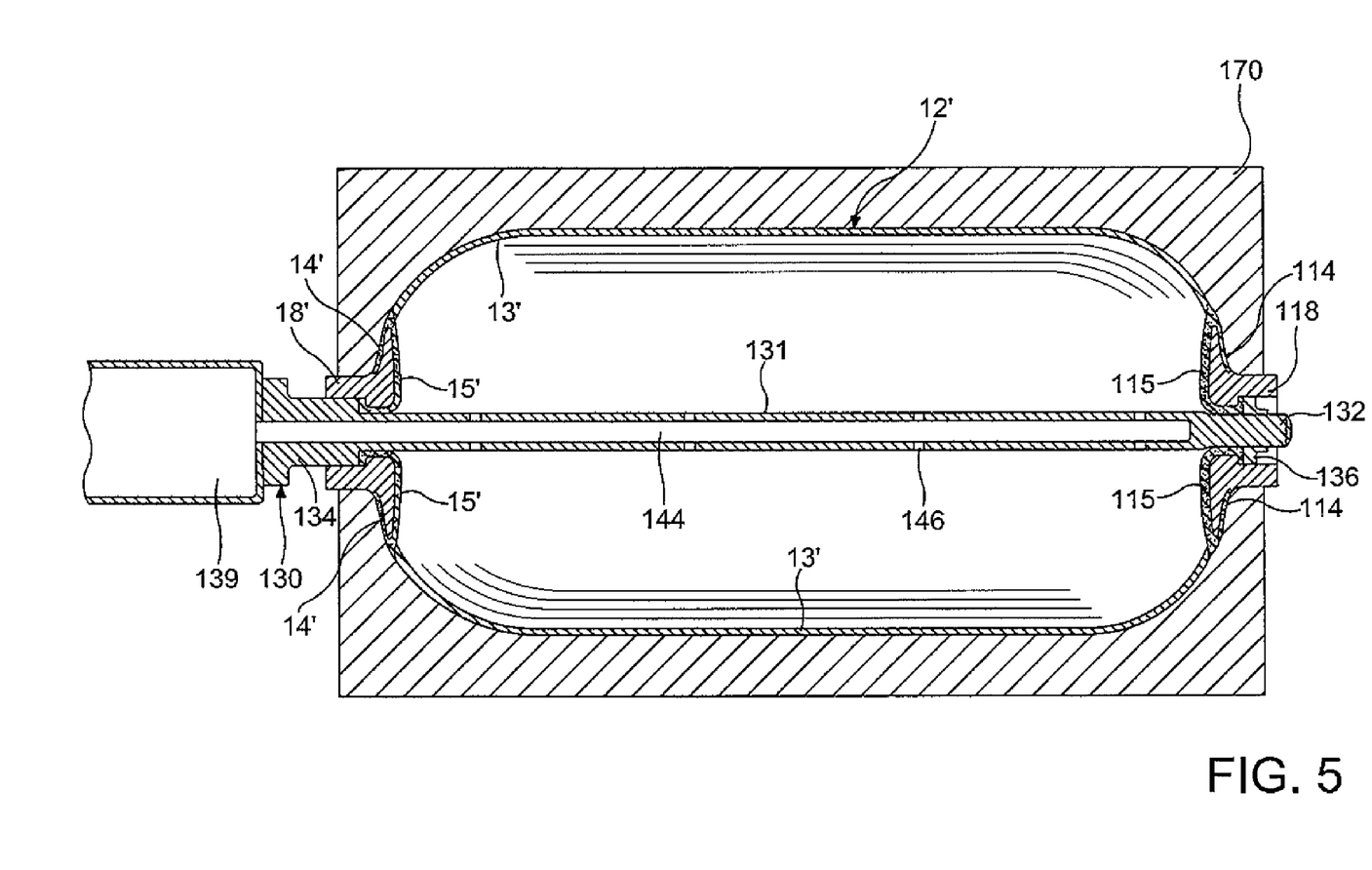
FIG. 5 is a cross-sectional elevational view of a liner of the vessel illustrated in FIG. 2 disposed in a die.

Subsequently, a second the 170, shown in FIG. 5, closes around the preform 160 and the vessel penetration elements 18', 118 securing the preform 160 to the vessel penetration elements 18', 118 and forming a substantially fluid-tight connection therebetween. Optionally, the preform 160 may be heated to a desired temperature after removal from the first die 150 and before closure of the second die 170. The positioning apparatus 130 facilitates a proper position and alignment of the vessel penetration elements 18', 118 in the preform 160. Optionally, the inner wall of the positioning apparatus 130 is then rotated to the first position causing the apertures of the inner wall to substantially align with the apertures 146 of the shaft 131. Thereafter, the fluid is then caused to flow from the fluid source 139 through the passageway 144 and through the apertures 146. Accordingly, the preform 160 is caused to expand and conform to a shape of the closed second die 170 and form the liner 12'. After the liner 12' has reached a desired form, the second die 170 releases the formed liner 12'. The adapter device 136 is removed from the first end 132. The positioning apparatus 130 is then removed from the vessel penetration elements 18', 118 such as by a disconnection of the threaded connection, the dovetail interlock connection, the ball and detent connection, the lock bar connection, and the like, for example.

By forming the vessel penetration elements 18', 118 with the respective interfacial features 14', 15', 114, 115, the vessel penetration elements 18', 118 can have any shape and size, as desired. Because the liner 12' is injection blow molded, interfacial features 15', 115 are formed with a proper sealing surface, eliminating rework or additional manufacturing processes. Furthermore, the injection blow molding process is highly automatic and more efficient than a typical forming process. The injection blow molding process also permits the use of PET to form the liner 12', whereby PET is more adept to receive a coating thereon than liners formed from other materials. Once the formed liner 12' has cooled, the die 170 is opened and the formed liner 12' is removed. The outer shell 16' is then formed around the liner 12' with the filament winding and curing process. It is understood that the outer shell 16' can be formed around the liner 12' by other forming processes, as desired.

Figure 6:
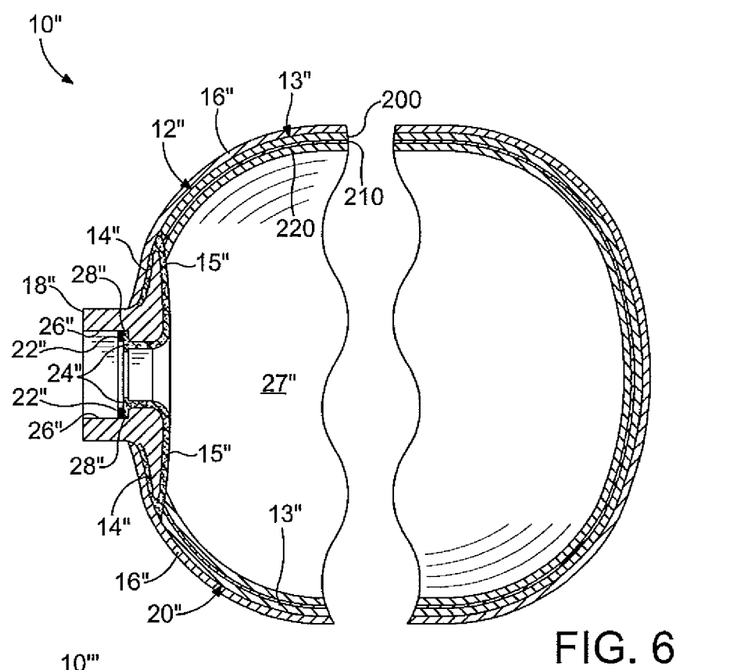
FIG. 6 is a cross-sectional elevational view of a vessel according to another embodiment of the invention.

FIG. 6 shows a vessel 10" according to another embodiment of the invention. The embodiment of FIG. 6 is similar to the vessels 10, 10' of FIGS. 1-5, except as described below. Similar to the structure of FIGS. 1-5, FIG. 6 includes the same reference numerals accompanied by a prime (") to denote similar structure.

The vessel 10" includes a hollow liner 12" having a main body 13", a first interfacial feature 14", and a second interfacial feature 15". In the embodiment shown, the vessel 10" further includes an outer shell 16". The vessel 10" has a substantially cylindrical shape and is adapted to hold a pressurized fluid (not shown). It is understood that the vessel 10" may have any shape as desired, and the vessel 10" may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example.

As shown, the main body 13" includes an outer layer 200, a barrier layer 210, and an inner layer 220. The outer layer 200 substantially abuts the outer shell 16" of the vessel 10" and the barrier layer 210. The outer layer 200 may be formed from any moldable material such as polyethylene, PET, ethylene vinyl alcohol, and a polyamide material, for example. The barrier layer 210 is sandwiched between the outer layer 200 and the inner layer 220 to militate against permeation of the pressurized fluid through the main body 13" into the atmosphere surrounding the vessel 10". The barrier layer 210 may be formed from any moldable material such as a thermoplastic (e.g. ethylene vinyl alcohol and a polyamide material), for example. The inner layer 220 of the main body 13" substantially abuts the barrier layer 210. The inner layer 220 may be formed from any moldable material such as polyethylene, PET, ethylene vinyl alcohol, and a polyamide material, for example. It is understood that the moldable materials used to form the layers 200, 210, 220 may be selected based on the process used to form the main body 13" of the liner 12", the use of the vessel 10", and the properties of the fluid to be stored in the vessel 10".

The interfacial features 14", 15" are formed around at least a portion of a vessel penetration element 18" such as a boss, a component of a divided boss, a fitting, an insert, and the like, for example. The interfacial features 14", 15" are disposed at a first end 20" of the liner 12". The interfacial features 14", 15" are formed from a reinforced moldable material such as a fiberglass reinforced thermoplastic (e.g. reinforced polyethylene, PET, and a polyamide material), for example. It is recognized that to optimize a connection between mating surfaces of the interfacial features 14", 15" and the vessel penetration element 18", the reinforced moldable material used to produce the interfacial features 14", 15" has a coefficient of linear thermal expansion between a coefficient of linear thermal expansion of a material used to produce the vessel penetration element 18" and a coefficient of linear thermal expansion of the materials used to produce the main body 13" of the liner 12". At least one of the interfacial features 14", 15" may include a gasket 22", such as a polymeric o-ring, for example, disposed thereon. In the embodiment shown, the gasket 22" is disposed adjacent an annular shoulder 24" of the interfacial feature 15" and an inner surface 26" of the vessel penetration element 18". The gasket 22" is adapted to form a fluid-tight seal between the interfacial feature 15" and a fluid-communication element (not shown) for communicating with an interior 27" of the vessel 10", such as a fitting, a hose, a nozzle, a conduit, and the like, for example. It is understood that the gasket 22" may be disposed elsewhere between the interfacial feature 15" and the fluid-communication element, if desired. The gasket 22" may be any conventional gasket formed from a material which facilitates forming a fluid-tight seal between two contacting surfaces.

The vessel penetration element 18" is typically a separately produced finish that forms an opening into the interior 27" of the vessel 10", and is shaped to receive a closure element (not shown). The vessel 10" may include any number of vessel penetration elements 18", as desired. The vessel penetration element 18" includes an annular shoulder 28" formed on the inner surface 26" thereof disposed adjacent the annular shoulder 24" of the interfacial feature 15". The vessel penetration element 18" may also include at least one of an annular groove (not shown) and threads (not shown) formed on the inner surface 26" thereof adapted to receive a portion of the fluid-communication element. The vessel penetration element 18" may be formed from any suitable material having desired properties such as a metal, for example.

In the embodiment shown, the outer shell 16" of the vessel 10" substantially abuts the outer layer 200 of the main body 13" and a portion of the interfacial feature 14". A portion of the outer shell 16" is disposed on the vessel penetration element 18". The outer shell 16" is typically formed by a filament winding and curing process using a fiber material such as a carbon fiber, a glass fiber, a composite fiber, and a fiber having a resin coating, for example. It is understood that the material used to form the outer shell 16" may be selected based on the process used to dispose the outer shell 16" onto the liner 12", the use of the vessel 10", and the properties of the fluid to be stored in the vessel 10". It is further understood that the outer shell 16" can be formed by other forming methods, as desired.

Figure 7:
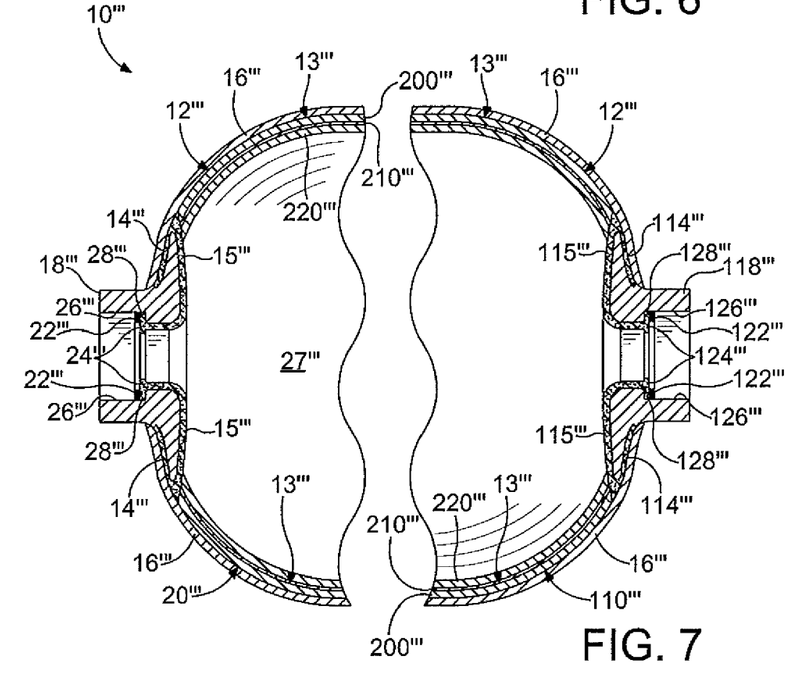
FIG. 7 is a cross-sectional elevational view of a vessel according to another embodiment of the invention.

FIG. 7 shows a vessel 10''' according to another embodiment of the invention. The embodiment of FIG. 7 is similar to the vessels 10, 10', 10" of FIGS. 1-6, except as described below. Similar to the structure of FIGS. 1-6, FIG. 7 includes the same reference numerals accompanied by a prime ("'") to denote similar structure.

The vessel 10''' includes a hollow liner 12''' having a main body 13''', a first end 20''', and a second end 110'''. In the embodiment shown, the vessel 10''' further includes an outer shell 16'''. The vessel 10''' has a substantially cylindrical shape and is adapted to hold a pressurized fluid (not shown). It is understood that the vessel 10''' may have any shape as desired, and the vessel 10''' may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example.

As shown, the main body 13''' includes an outer layer 200''', a barrier layer 210''', and an inner layer 220'''. The outer layer 200''' substantially abuts the outer shell 16''' of the vessel 10''' and the barrier layer 210'''. The outer layer 200''' may be formed from a moldable material 300 shown in FIG. 8 such as polyethylene, PET, ethylene vinyl alcohol, and a polyamide material, for example. The barrier layer 210''' is sandwiched between the outer layer 200''' and the inner layer 220''' to militate against permeation of the pressurized fluid through the main body 13''' into the atmosphere surrounding the vessel 10'''. The barrier layer 210''' may be formed from a moldable material 310 shown in FIG. 8 such as a thermoplastic (e.g. ethylene vinyl alcohol and a polyamide material), for example. The inner layer 220''' of the main body 13''' substantially abuts the barrier layer 210'''. The inner layer 220''' may be formed from the moldable material 300. It is understood that the moldable materials 300, 310 used to form the layers 200''', 210''', 220''' may be selected based on the process used to form the main body 13''' of the liner 12''', the use of the vessel 10''', and the properties of the fluid to be stored in the vessel 10'''.

A first interfacial feature 14''' and a second interfacial feature 15''' are formed at the first end 20''' of the liner 12'''. The interfacial features 14''', 15''' are formed around at least a portion of a vessel penetration element 18''' such as a boss, a component of a divided boss, a fitting, an insert, and the like, for example. The interfacial features 14''', 15''' are formed from a reinforced moldable material 154''' shown in FIG. 8 such as a fiberglass reinforced thermoplastic (e.g. reinforced polyethylene, PET, and a polyamide material), for example. It is recognized that to optimize a connection between mating surfaces of the interfacial features 14''', 15''' and the vessel penetration element 18''', the reinforced moldable material 154''' used to produce the interfacial features 14''', 15''' has a coefficient of linear thermal expansion between a coefficient of linear thermal expansion of a material used to produce the vessel penetration element 18''' and a coefficient of linear thermal expansion of the moldable materials 300, 310 used to produce the main body 13''' of the liner 12'''. At least one of the interfacial features 14''', 15''' may include a gasket 22''', such as a polymeric o-ring, for example, disposed thereon. In the embodiment shown, the gasket 22''' is disposed adjacent an annular shoulder 24''' of the interfacial feature 15''' and an inner surface 26''' of the vessel penetration element 18'''. The gasket 22''' is adapted to form a fluid-tight seal between the interfacial feature 15''' and a fluid-communication element (not shown) for communicating with an interior 27''' of the vessel 10''', such as a fitting, a hose, a nozzle, a conduit, and the like, for example. It is understood that the gasket 22''' may be disposed elsewhere between the interfacial feature 15''' and the fluid-communication element, if desired. The gasket 22''' may be any conventional gasket formed from a material which facilitates forming a fluid-tight seal between two contacting surfaces.

The vessel penetration element 18''' is typically a separately produced finish that forms an opening into the interior 27''' of the vessel 10''', and is shaped to receive a closure element (not shown). The vessel 10''' may include any number of vessel penetration elements 18''', as desired. The vessel penetration element 18''' includes an annular shoulder 28''' formed on the inner surface 26''' thereof disposed adjacent the annular shoulder 24''' of the interfacial feature 15'''. The vessel penetration element 18''' may also include at least one of an annular groove (not shown) and threads (not shown) formed on the inner surface 26''' thereof adapted to receive a portion of the fluid-communication element. The vessel penetration element 18''' may be formed from any suitable material having desired properties such as a metal, for example.

A third interfacial feature 114''' and a fourth interfacial feature 115''' are formed at the second end 110''' of the liner 12'''. The interfacial features 114''', 115''' are formed around at least a portion of a vessel penetration element 118''' such as a boss, a component of a divided boss, a fitting, an insert, and the like, for example. The interfacial features 114''', 115''' are formed from a reinforced moldable material 158''' such as a fiberglass reinforced thermoplastic (e.g. reinforced polyethylene, PET, and a polyamide material), for example. It is recognized that to optimize a connection between mating surfaces of the interfacial features 114''', 115''' and the vessel penetration element 118''', the reinforced moldable material 158''' used to produce the interfacial features 114''', 115''' has a coefficient of linear thermal expansion between a coefficient of linear thermal expansion of a material used to produce the vessel penetration element 118''' and a coefficient of linear thermal expansion of the moldable materials 300, 310 used to produce the main body 13''' of the liner 12'''. At least one of the interfacial features 114''', 115''' may include a gasket 122''', such as a polymeric o-ring, for example, disposed thereon. In the embodiment shown, the gasket 122''' is disposed on an annular shoulder 124''' of the interfacial feature 115''' adjacent an inner surface 126" of the vessel penetration element 118'''. The gasket 122''' is adapted to form a fluid-tight seal between the interfacial feature 115''' and a fluid-communication element (not shown) for communicating with the interior 27''' of the vessel 10''', such as a fitting, a hose, a nozzle, a conduit, and the like, for example. It is understood that the gasket 122''' may be disposed elsewhere between the interfacial feature 115''' and the fluid-communication element, if desired. The gasket 122''' may be any conventional gasket formed from a material which facilitates forming a fluid-tight seal between two contacting surfaces.

The vessel penetration element 118''' is typically a separately produced finish that forms an opening into the interior 27''' of the vessel 10''', and is shaped to receive a closure element (not shown). The vessel 10''' may include any number of vessel penetration elements 118''', as desired. The vessel penetration element 118''' includes an annular shoulder 128''' formed on the inner surface 126" thereof disposed adjacent the annular shoulder 124''' of the interfacial feature 115'''. The vessel penetration element 118''' may also include at least one of an annular groove (not shown) and threads (not shown) formed on the inner surface 126''' thereof adapted to receive a portion of the fluid-communication element. The vessel penetration element 118''' may be formed from any suitable material having desired properties such as a metal, for example.

In the embodiment shown, the outer shell 16''' of the vessel 10''' substantially abuts the main body 13''' of the liner 12''' and a portion of the interfacial features 14''', 114'''. A portion of the outer shell 16''' is disposed on the vessel penetration elements 18''', 118'''. The outer shell 16''' is typically formed by a filament winding and curing process using a fiber material such as a carbon fiber, a glass fiber, a composite fiber, and a fiber having a resin coating, for example. It is understood that the material used to form the outer shell 16''' may be selected based on the process used to dispose the outer shell 16''' onto the liner 12''', the use of the vessel 10''', and the properties of the fluid to be stored in the vessel 10'''. It is further understood that the outer shell 16''' can be formed by other forming methods, as desired.

To form the vessels 10''', 10''', the respective liners 12''', 12''' are injection blow molded. It is understood that the injection blow molding process of the vessel 10''' is substantially similar to the injection blow molding process of the vessel 10'''. For simplicity only the forming of the vessel 10''' is described hereinafter.

Figure 8:
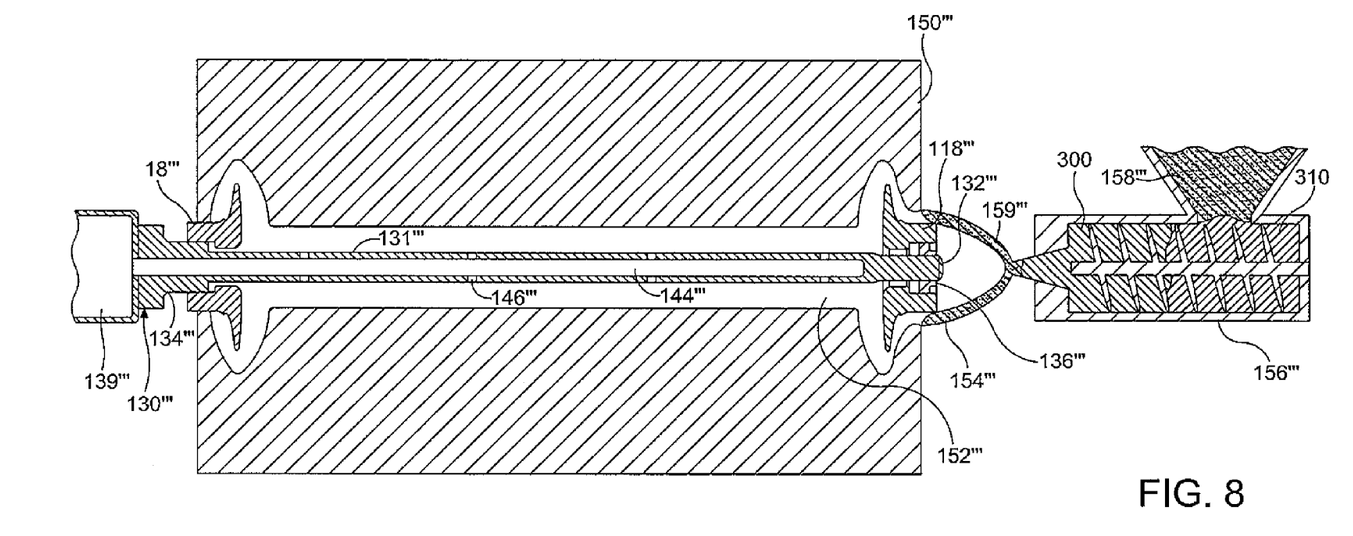
FIG. 8 is a schematic cross-sectional elevational view of an injector in fluid communication with a die having a pair of vessel penetration elements of the vessel illustrated in FIG. 7 disposed therein.

Referring now to FIG. 8, the vessel penetration elements 18''', 118''' are disposed on a positioning apparatus 130'''. In the embodiment shown, the positioning apparatus 130''' is an elongated shaft 131''' having a first end 132''' and a second end 134'''. It is understood that the positioning apparatus 130''' can have any length and diameter as desired suitable for any type of vessel. It is further understood that the positioning apparatus 130''' can have an adjustable length and an adjustable diameter if desired. Although the positioning apparatus 130''' shown is a unitary structure, it is understood that the positioning apparatus 130''' can be an integration of multiple structures if desired. It is further understood that the positioning apparatus 130''' can be a telescoping apparatus, thereby minimizing a time and a space required for use of the positioning apparatus 130''' and the manufacture of the liner 12''' of the vessel 10". The positioning apparatus 130''' can be produced from any material as desired such as a metal material, for example.

The first end 132''' receives an adapter device 136''' thereon. At least one of the first end 132''' and the adapter device 136''' cooperates with one of the groove and the threads formed on the inner surface 126''' of the vessel penetration element 118''' to form a substantially fluid-tight connection. It is understood, however, that the substantially fluid-tight connection can be formed elsewhere between various mating surfaces of the adapter device 136''', the first end 132''', and the vessel penetration element 118''', as desired. The second end 134''' cooperates with one of the groove and the threads formed on the inner surface 26''' of the vessel penetration element 18''' to form a substantially fluid-tight connection. It is understood, however, that the substantially fluid-tight connection can be formed elsewhere between various mating surfaces of the second end 134''' and the vessel penetration element 18''', as desired. It is further understood that the vessel penetration elements 18''', 118''' can be removably secured to the positioning apparatus 130''' by any method of connection such as a threaded connection, a dovetail interlock connection, a ball and detent connection, a lock bar connection, and the like, for example.

The second end 134''' is in fluid communication with a blow molding fluid source 139'''. It is understood that the fluid can be any fluid as desired such as air, for example. The second end 134''' may be coupled to the fluid source 139''' such as by a quick connection, a threaded connection, and the like, for example. It is understood that the fluid source 139''' can be integrally formed with the positioning apparatus 130''' if desired. A passageway 144''' is formed in the shaft 131'''. The passageway 144''' is in fluid communication with the fluid source 139''' through an opening in the second end 134'''. The shaft 131''' includes a plurality of linearly spaced annular arrays of apertures 146''' formed therein. The apertures 146''' permit a flow of the fluid from the passageway 144''' to an environment surrounding the positioning apparatus 130'''. In the embodiment shown, the apertures 146''' have a uniform size and shape and are uniformly spaced apart to facilitate a proper inflation of the liner 12''' of the vessel 10'''. It is understood that the apertures 146''' can have any size and shape and can be spaced apart as desired such as a size and shape to militate against a flow of the moldable materials 300, 310, 154''', 158''' therein, for example. Alternatively, the positioning apparatus 130''' may further include a rotatable inner wall (not shown) having a plurality of linearly spaced annular arrays of apertures (not shown). In a first position, the apertures of the inner wall substantially align with the apertures 146''' of the positioning apparatus 130''' to permit the flow of fluid therethrough. In a second position, the inner wall facilitates a closure of the apertures 146''', thereby militating against the flow of fluid therethrough and the flow of the moldable materials 300, 310, 154''', 158''' therein.

Figure 9:
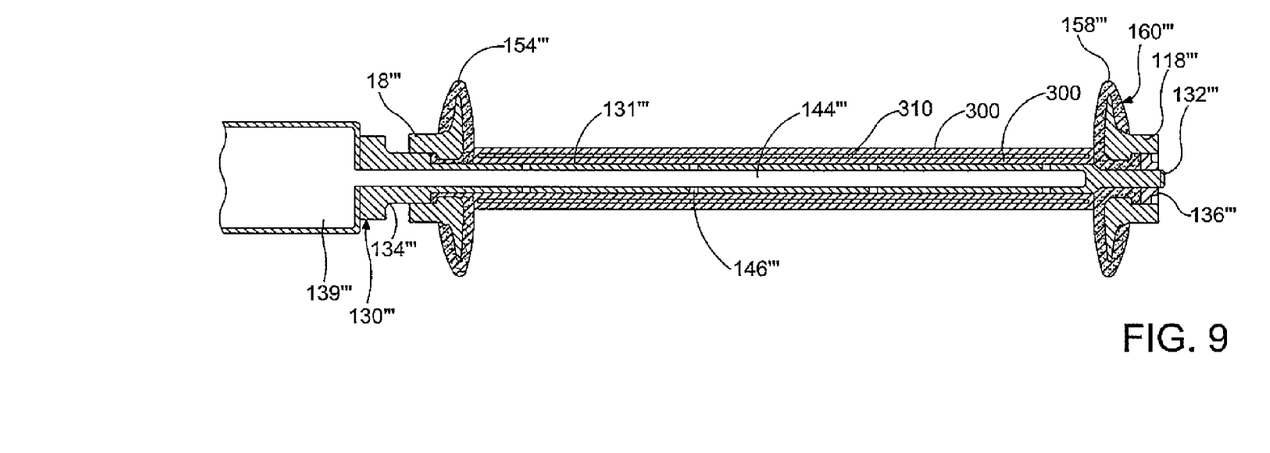
FIG. 9 is a cross-sectional elevational view of a preform used to form the vessel illustrated in FIG. 7.

During the injection blow molding process, the vessel penetration elements 118''', 18''' are disposed on the respective ends 132''', 134''' of the positioning apparatus 130'''. Subsequently, the adapter device 136''' is received on the first end 132'''. Optionally, the inner wall of the positioning apparatus 130''' is rotated to the second position, closing the apertures 146''' formed in the shaft 131''' of the positioning apparatus 130'''. Thereafter, a first die 150''' such as a matched metal mold, for example, closes around the positioning apparatus 130''' and the vessel penetration elements 18''', 118''', forming a cavity 152''' therebetween. A molten form of the reinforced moldable material 154''' is then injected from an injector 156''', into and through a ring gate 159''', and into the cavity 152''' of the first die 150'''. Subsequently, a molten form of the moldable material 300 used to produce the layers 200, 220 of the main body 13''' of the liner 12''' is injected from the injector 156''', into and through the ring gate 159''', and into the cavity 152''' of the first die 150''' adjacent the injected reinforced moldable material 154'''. A molten form of the moldable material 310 used to produce the barrier layer 210 is then injected from the injector 156''', into and through the ring gate 159''', and into a core of the moldable material 300. Thereafter, a molten form of the reinforced moldable material 158''' is injected from the injector 156''', into and through the ring gate 159''', and into the cavity 152''' of the first die 150'' adjacent the injected moldable materials 300, 310. A preform 160''', shown in FIG. 9, is formed substantially around a portion of the vessel penetration elements 18''', 118''' and the shaft 131''' of the positioning apparatus 130'''. The preform 160''' is permitted to cool in the first die 150''' for a desired time. It is understood that the desired time is only as long as necessary for the preform 160''' to retain a shape thereof when removed from the first die 150'''.

Subsequently, a second die (not shown) closes around the preform 160''' and the vessel penetration elements 18''', 118''' securing the preform 160''' to the vessel penetration elements 18''', 118''' and forming a substantially fluid-tight connection therebetween. Optionally, the preform 160''' may be heated to a desired temperature after removal from the first die 150''' and before closure of the second die. The positioning apparatus 130''' facilitates a proper position and alignment of the vessel penetration elements 18''', 118''' in the preform 160'''. Optionally, the inner wall of the positioning apparatus 130''' is then rotated to the first position causing the apertures of the inner wall to substantially align with the apertures 146''' of the shaft 131'''. Thereafter, the fluid is then caused to flow from the fluid source 139''' through the passageway 144''' and through the apertures 146'''. Accordingly, the preform 160''' is caused to expand and conform to a shape of the closed second die and form the liner 12'''. After the liner 12''' has reached a desired form, the second die releases the formed liner 12'''. The adapter device 136''' is removed from the first end 132'''. The positioning apparatus 130''' is then removed from the vessel penetration elements 18''', 118''' such as by a disconnection of the threaded connection, the dovetail interlock connection, the ball and detent connection, the lock bar connection, and the like, for example.

By forming the vessel penetration elements 18''', 118''' with the respective interfacial features 14''', 15''', 114''', 115''', the vessel penetration elements 18''', 118''' can have any shape and size, as desired. Because the liner 12''' is injection blow molded, interfacial features 15''', 115''' are formed with a proper sealing surface, eliminating rework or additional manufacturing processes. Furthermore, the injection blow molding process is highly automatic and more efficient than a typical forming process. The injection blow molding process also permits the use of PET to form the liner 12''', whereby PET is more adept to receive a coating thereon than liners formed from other materials. Once the formed liner 12''' has cooled, the die is opened and the formed liner 12''' is removed. The outer shell 16''' is then formed around the liner 12''' with the filament winding and curing process. It is understood that the outer shell 16''' can be formed around the liner 12''' by other forming processes, as desired.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for producing a liner of a vessel, the method comprising the steps of:
    disposing a first vessel penetration element into a die having a cavity formed therein;
    injecting a first moldable material into the cavity to form a first portion of a preform, wherein the first portion of the preform substantially surrounds at least a portion of the vessel penetration element;
    injecting a second moldable material into the cavity to form a second portion of the preform; and
    forming the preform into a hollow liner.

2. The method according to claim 1, wherein the first moldable material is a reinforced thermoplastic material.

3. The method according to claim 1, wherein the second moldable material is a thermoplastic material.

4. The method according to claim 1, further comprising the step of injecting a third moldable material into the cavity to form a third portion of the preform, wherein the third portion of the preform substantially surrounds at least a portion of a second vessel penetration element.

5. The method according to claim 4, wherein the third moldable material is a reinforced thermoplastic material.

6. The method according to claim 1, further comprising the step of forming an outer shell substantially around the hollow liner.

7. The method according to claim 1, further comprising the step of providing a gasket between the hollow liner and a fluid-communication element adapted to form a substantially fluid tight seal between the hollow liner and the fluid-communication element.

8. The method according to claim 1, further comprising the step of injecting another moldable material into the second portion of the preform formed from the second moldable material to form another portion of the preform.

9. The method according to claim 8, wherein the another moldable material is a thermoplastic material.

10. A method for producing a liner of a vessel, the method comprising the steps of:
    disposing a first vessel penetration element into a die having a cavity formed therein;
    injecting a first reinforced moldable material into the cavity to form a first portion of a preform, wherein the first portion of the preform substantially surrounds at least a portion of the vessel penetration element;
    injecting a second moldable material into the cavity to form a second portion of the preform;
    forming the preform into a hollow liner, the hollow liner including a main body, a first interfacial feature, and a second interfacial feature, wherein the main body is formed from the second moldable material and the interfacial features are formed from the first reinforced moldable material; and
    forming an outer shell substantially around the hollow liner.

11. The method according to claim 10, wherein the first reinforced moldable material is a reinforced thermoplastic material.

12. The method according to claim 10, wherein the second moldable material is a thermoplastic material.

13. The method according to claim 10, further comprising the step of injecting a third reinforced moldable material into the cavity to form a third portion of the preform, wherein the third portion of the preform substantially surrounds at least a portion of a second vessel penetration element.

14. The method according to claim 13, wherein the third reinforced moldable material is a reinforced thermoplastic material.

15. A method for producing a liner of a vessel, the method comprising the steps of:
- disposing a first vessel penetration element into a die having a cavity formed therein;
- injecting a first moldable material into the cavity to form a first portion of a perform, wherein the first portion of the perform substantially surrounds at least a portion of the vessel penetration element;
- injecting a second moldable material into the cavity to form a second portion of the preform;
- injecting a third moldable material into a core of the second portion of the preform formed from the second moldable material; and
- forming the preform into a hollow liner.

16. The method according to claim 15, wherein the first moldable material is a reinforced thermoplastic material.

17. The method according to claim 15, wherein the second moldable material is a thermoplastic material.

18. The method according to claim 15, wherein the third moldable material is a thermoplastic material.

19. The method according to claim 15, further comprising the step of injecting a fourth moldable material into the cavity to form a third portion of the preform, wherein the third portion of the preform substantially surrounds at least a portion of a second vessel penetration element.

20. The method according to claim 19, wherein the fourth moldable material is a reinforced thermoplastic material.

* * * * *